No. 833,948.  
PATENTED OCT. 23, 1906.

B. TRENCKMANN.  
DRESS PRESERVER.  
APPLICATION FILED MAR. 13, 1906.

Witnesses:  
G. Wm. Eisenbaum  
Sally O. Yudizky

Bruno Trenckmann Inventor

By his Attorney Aedh P. Schuck

THE NORRIS PETERS CO., WASHINGTON, D. C.

UNITED STATES PATENT OFFICE.

BRUNO TRENCKMANN, OF SCHÖNEBERG, NEAR BERLIN, GERMANY.

DRESS-PRESERVER.

No. 833,948.     Specification of Letters Patent.     Patented Oct. 23, 1906.

Application filed March 13, 1906. Serial No. 305,912.

*To all whom it may concern:*

Be it known that I, BRUNO TRENCKMANN, manufacturer, a subject of the German Emperor, and a resident of 8 Mühlenstrasse, in the city of Schöneberg, near Berlin, Germany, have invented new and useful Improvements in Dress-Preservers, of which the following is a specification.

My invention relates to a dress-preserving lining or shield against perspiration and the like, forming a substitute for the present shields, which are not so durable and which in the course of time become sticky, hard, or brittle.

For this purpose my invention consists, essentially, in a shield consisting of a base of cloth, preferably waterproofed and covered on one side with animal skin or membrane also preferably waterproofed.

The nature of my invention will be best understood in connection with the accompanying drawings, in which—

Figure 1:
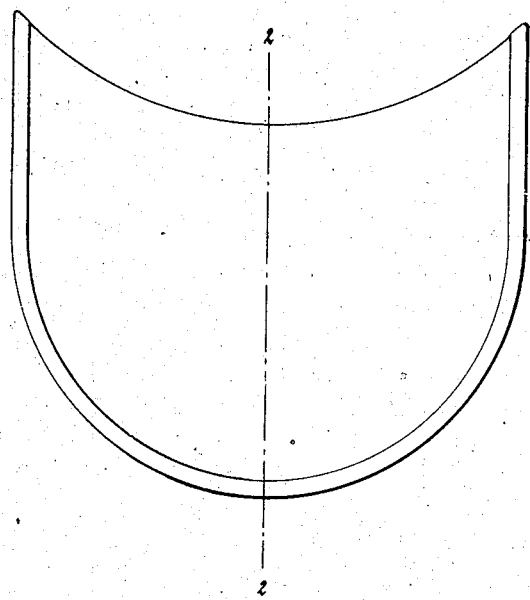
Figure 2:
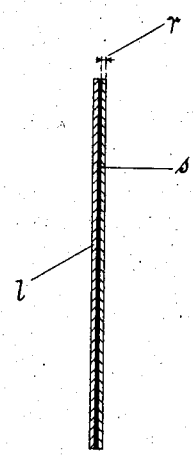

Figure 1 is an elevation of a dress-shield. Fig. 2 is an enlarged sectional view on the line 2 2, Fig. 1.

From the drawings it will be seen that my improved lining or shield is made up of a base *l* of cloth—such as linen, batiste, or the like—and covered on one side with animal skin or membrane *s*, such as the tanned or untanned outer skin of the blind-gut or gold-beaters' skin. The skin or membrane is rendered waterproof by a thin coating of rubber *r* and is cemented directly to the cloth, which preferably has also been waterproofed by means of a rubber solution or treatment. The adhesion can in both cases be fixed by a subsequent vulcanizing, which may be accomplished in any known manner, as in bringing the dress-shield in the vapors of bisulfid of carbon. When tanned or untanned gold-beaters' skin is used, it can be first cut to the shape of the dress-preserver and then secured to the linen and the like by means of rubber solution. Both could also be placed loosely one on the other and connected together only at the edge by cementing.

If it be desired to cement the skin to the linen, it is preferable to first treat the skin by putting it into a strong solution of carbonate of soda and then stretching it in a frame to dry quickly. Such skin prepared in this manner has the property of being nearly white and of retaining its color after wetting, &c. It is impermeable to the rubber solvent, so that it presents a neat appearance. It does not become creased and can be washed.

What I claim as new, and desire to secure by Letters Patent of the United States, is—

1. A dress preserver or shield consisting of a base of cloth covered on one side thereof with gold-beaters' skin.

2. A dress preserver or shield consisting of a base of linen covered on one side thereof with gold-beaters' skin.

3. A dress preserver or shield consisting of a base of cloth covered on one side thereof with tanned goldbeater's-skin.

4. A dress preserver or shield consisting of a base of cloth covered on one side thereof with animal skin previously treated with soda-lye and quickly dried while stretched on a frame.

5. A dress preserver or shield consisting of a base of cloth covered on one side thereof with waterproofed gold-beaters' skin.

6. A dress preserver or shield consisting of a waterproofed cloth base covered on one side thereof with gold-beaters' skin.

7. A dress preserver or shield consisting of a waterproofed cloth base covered on one side thereof with waterproofed gold-beaters' skin.

8. A dress preserver or shield consisting of a base of cloth covered on one side thereof with gold-beaters' skin, and means to secure said skin to said linen.

9. A dress preserver or shield consisting of a base of cloth and gold-beaters' skin which is cemented thereto on one side by means of a rubber cement.

10. A dress preserver or shield consisting of a base of cloth waterproofed with rubber solution and covered on one side thereof with gold-beaters' skin rendered waterproof by a thin coating of rubber.

In testimony that I claim the foregoing as my invention I have signed my name, in presence of two witnesses, this 23d day of February, 1906.

BRUNO TRENCKMANN.

Witnesses:
   WOLDEMAR HAUPT,
   HENRY HASPER.